(12) United States Patent
Huber et al.

(10) Patent No.: US 7,265,487 B2
(45) Date of Patent: Sep. 4, 2007

(54) DISCHARGE LAMP WITH AN ARRANGEMENT OF PHOSPHOR LAYERS EXCITABLE BY VUV AND UVA RADIATION

(75) Inventors: Günter Huber, Schrobenhausen (DE); Frank Jermann, München (DE); Ulrich Müller, München (DE); Martin Zachau, Geltendorf (DE)

(73) Assignee: Patent-Treuhand-Gesellschaft fuer Elektrische Gluehlampen mbH

( * ) Notice: Subject to any disclaimer, the term of this patent is extended or adjusted under 35 U.S.C. 154(b) by 98 days.

(21) Appl. No.: 10/852,126

(22) Filed: May 25, 2004

(65) Prior Publication Data

US 2005/0001533 A1    Jan. 6, 2005

(30) Foreign Application Priority Data

Jun. 2, 2003    (DE) ................. 103 24 832

(51) Int. Cl.
  *H01J 1/62*    (2006.01)
  *H01J 63/04*   (2006.01)
(52) U.S. Cl. .............. 313/487; 313/485; 313/486
(58) Field of Classification Search ........ 313/484–487, 313/635
  See application file for complete search history.

(56) References Cited

U.S. PATENT DOCUMENTS

| | | | |
|---|---|---|---|
| 4,914,347 A * | 4/1990 | Osawa et al. ............... 313/485 |
| 5,444,331 A * | 8/1995 | Matsuno et al. ............ 313/553 |
| 5,666,026 A * | 9/1997 | Matsuno et al. ............ 313/634 |
| 5,714,835 A | 2/1998 | Zachau et al. .............. 313/486 |
| 5,994,849 A | 11/1999 | Vollkommer et al. ....... 315/246 |
| 6,613,248 B2 * | 9/2003 | Setlur et al. .......... 252/301.4 R |
| 6,734,631 B2 | 5/2004 | Juestel et al. |
| 6,867,536 B2 * | 3/2005 | Srivastava et al. .......... 313/487 |
| 6,982,046 B2 * | 1/2006 | Srivastava et al. .......... 313/639 |
| 2003/0011310 A1 * | 1/2003 | Juestel et al. ............... 313/640 |
| 2004/0012325 A1 * | 1/2004 | Doll et al. .................. 313/486 |
| 2004/0251807 A1 | 12/2004 | Huber et al. |

* cited by examiner

*Primary Examiner*—Nimeshkumar D. Patel
*Assistant Examiner*—Peter Macchiarolo
(74) *Attorney, Agent, or Firm*—Robert F. Clark

(57) ABSTRACT

A discharge lamp (1) having a discharge vessel (2) which surrounds a discharge medium which emits electromagnetic radiation in the VUV region when the lamp is operating has, on the inner side of the discharge vessel wall, a first phosphor layer, which faces the discharge medium and comprises a UVA component which can be excited by the VUV radiation and is intended to emit electromagnetic radiation in the UVA region. A second phosphor layer, which can be excited by the UVA radiation and is intended to emit electromagnetic radiation in the visible region either lies beneath the first phosphor layer or is applied to the outer side of the discharge vessel wall. This results in a lower color locus shift compared to a conventional phosphor mixture, which can be excited directly by VUV radiation.

23 Claims, 1 Drawing Sheet

DISCHARGE LAMP WITH AN ARRANGEMENT OF PHOSPHOR LAYERS EXCITABLE BY VUV AND UVA RADIATION

TECHNICAL FIELD

The invention is based on a discharge lamp with phosphor, in which, in operation, electromagnetic radiation is emitted predominantly in the VUV region by a discharge medium contained inside the discharge vessel of the discharge lamp. In this context, the term VUV region is to be understood as meaning wavelengths below approx. 200 nm, in particular in the range from approx. 100 nm to 200 nm. The VUV radiation is converted into radiation of longer wavelengths, for example into the visible spectral region, with the aid of the phosphor.

In particular, the invention also relates to discharge lamps of the above type, which are also designed for operation by means of dielectric barrier discharge, known as dielectric barrier discharge lamps. Discharge lamps of this type have per se been presented in the prior art, and a very wide range of their details have been disclosed in earlier patent applications in the name of the same Applicant. The basic physical and technical details of discharge lamps of this type will not be dealt with in detail in the present application, but rather reference is made instead to the relevant prior art, in which these lamps are occasionally referred to as silent discharge lamps. These lamps are in particular also suitable for pulsed operation, which results in particularly good efficiency of radiation generation. These lamps are typically filled with noble gas, preferably xenon, or noble gas mixtures. When the lamp is operating, in particular excimers, for example $Xe_2^*$, which emit a molecular band radiation with a maximum at approx. 172 nm, are formed inside the discharge vessel.

For applications which require a white light, for example for general illumination, color scanners, the backlighting of liquid crystal displays and the like, the VUV radiation is converted by means of suitable white-light phosphor mixtures. Depending on the requirements imposed on the color rendering properties of the lamp, two-band phosphor mixtures, e.g. a blue-emitting phosphor component and a yellow-emitting phosphor component, or three-band phosphor mixtures, e.g. a red-emitting phosphor component, a green-emitting phosphor component and a blue-emitting phosphor component, may be suitable for this purpose. However, one problem is that in particular the blue phosphor components which are customarily used are damaged by the VUV radiation during the operating life of the lamp and thereby lose luminosity. As a result, the luminosity of the individual phosphor components of a phosphor mixture changes to different extents and the result is an increasing color locus shift. An additional factor is that the known red phosphor components have a relatively poor quantum efficiency when excited with VUV radiation.

BACKGROUND ART

U.S. Pat. No. 5,714,835 shows a dielectric barrier discharge lamp with a white-light phosphor mixture. The components of this white-light phosphor mixture are the red phosphor component $(Y_{0.72}Gd_{0.2}Eu_{0.08})BO_3$, the green phosphor component $(La_{0.43}Ce_{0.39}Tb_{0.18})PO_4$ and the blue phosphor-component $(Ba_{0.94}Eu_{0.06})MgAl_{10}O_{17}$. The discharge medium inside the lamp is the noble gas xenon. While the lamp is operating, the discharge medium emits radiation with wavelengths of shorter than 200 nm, which is converted into white light by the white-light phosphor mixture.

DISCLOSURE OF THE INVENTION

The object of the present invention is to eliminate the problems mentioned in the introduction and to provide a discharge lamp with phosphor which is filled with a discharge medium which, in operation, emits VUV radiation and which has an improved long-term performance in terms of its light engineering properties. One specific aspect of the object is for the lamp to have a lower color locus shift during its operating life.

This object is achieved by a discharge lamp, having a discharge vessel, a discharge medium which is located in the interior of the discharge vessel and, when the lamp is operating, emits electromagnetic radiation in the VUV region, a phosphor which is applied to the wall of the discharge vessel, the phosphor comprising a first phosphor layer, which is applied to the inner side of the wall of the discharge vessel and comprising a UVA component, which can be excited by the VUV radiation and is intended to emit electromagnetic radiation in the UVA region, the phosphor comprising a second phosphor layer, which can be excited by the UVA radiation and is intended to emit electromagnetic radiation in the visible region, the order of the phosphor layers being such that, as seen from the discharge medium, the first phosphor layer comes first, followed by the second phosphor layer.

In this discharge lamp, the second phosphor layer may either likewise be applied to the inner side of the wall of the discharge vessel, specifically beneath the first phosphor layer, or may be applied to the outer side of the wall of the discharge vessel. The former option has the advantage that the phosphor is completely within the discharge vessel and is therefore protected from external influences. The latter alternative has the advantage of simplifying lamp production, since lamps of different luminous colors can be produced simply by retrospective application of the phosphor layer which generates the visible radiation to the outer side of the discharge vessel of the otherwise finished "UVA lamp".

Further particularly advantageous configurations are to be found in the dependent claims.

To generate white light, the second phosphor layer typically comprises either two phosphor components, namely a blue-emitting phosphor component and a yellow- or orange-emitting phosphor component, or three phosphor components, namely a red-emitting, a green-emitting and a blue-emitting phosphor component. With a view to achieving a uniform phosphor coating and to minimizing the number of production steps required as far as possible, it is fundamentally advantageous for the two or three phosphor components to be applied as a phosphor mixture in a single phosphor layer. However, in principle it is also conceivable for each phosphor component to be applied as a separate phosphor layer.

Although the invention is suitable in particular for discharge lamps which are adapted for white light, it is not restricted to this specific application, but rather also encompasses discharge lamps which emit colored light.

At any rate, the abovementioned solution achieves two advantages straight away. Firstly, VUV-sensitive phosphor components, such as in particular blue phosphor components, e.g. $BaMgAl_{10}O_{17}$:Eu, are excited only by the UVA radiation emitted by the first phosphor layer located above.

This avoids the reduction in the luminosity of these VUV-sensitive phosphors, and the color locus shift which results with phosphor mixtures, which was mentioned in the introduction and is associated with the VUV irradiation. Secondly, the red phosphor components are preferably also excited by UVA radiation, which is significantly more efficient than excitation with VUV radiation. Green phosphor components are significantly less critical in this respect, i.e. are relatively stable under VUV irradiation and can efficiently be excited using VUV radiation. Therefore, green phosphor components, unlike blue phosphor components, do not necessarily have to be present exclusively in the second phosphor layer, but rather may also be mixed into the first phosphor layer with the UVA component. In this case, the green phosphor component is excited predominantly directly by the VUV radiation, whereas the phosphor components in the second phosphor layer are excited predominantly by the UVA radiation of the UVA component of the first phosphor layer and, moreover, are not exposed to any VUV irradiation, or at most are exposed to greatly reduced VUV irradiation. Consequently, the luminosity of the individual phosphor components is reduced to a significantly more uniform extent, and consequently the color locus shift is likewise lower than with conventional phosphor mixtures excited directly by VUV radiation. Although in principle the red phosphor component may likewise be mixed into the first phosphor layer with the UVA component, it is preferably provided in the second phosphor layer, since it can be excited more efficiently using UVA radiation, as has already been mentioned above.

The following have proven particularly suitable for use as the UVA component:

A) $Ce_{a-c}Ln_bR_cMg_dAl_{11}O_{16.5+1.5(a+b)-0.5c+d}$,
  where
  Ln=La, Y, Gd,
  R=Ba, Ca, Sr
  and
  $0.10 \leq a \leq 1.00$;
  $0 \leq b \leq 0.9$;
  $0 \leq c \leq 0.5a$;
  $0.45 \leq d \leq 2.00$;
  $a+b \leq 1$.

B) $Ln_{1-x}Ce_xPO_4$
  where
  Ln=La, Y, Gd or mixtures thereof
  and
  $0.01 \leq x \leq 0.30$
  preferably
  $0.02 \leq x \leq 0.10$.

C) $Ln_{1-x}Ce_xBO_3$
  where
  Ln=La, Y, Gd or mixtures thereof,
  and
  $0.01 \leq x \leq 0.20$
  preferably
  $0.02 \leq x \leq 0.10$.

The following are also suitable, albeit less so, for use as the UVA component:

D) $La_{1-x-y}GD_xBi_yB_3O_6$ with $0.37 \leq x \leq 0.80$ and $0.01 \leq y \leq 0.03$ E) $Gd_{1-x}Pr_xMgB_5O_{10}$ with $0.01 \leq x \leq 0.05$ F) $Ln_{1-x}Pr_xSiO_5$ with Ln=Y, Gd or mixtures thereof, where $0.01 \leq x \leq 0.05$ G) $Gd_{1-x}Ce_xMgB_5O_{10}$ with $0.02 \leq x \leq 0.30$ H) $BaLa_{1-x}Ce_xB_9O_{16}$ with $0.02 \leq x \leq 0.30$ J) $Ba_{1-x}Pb_xSi_2O_5$ with $0.02 \leq x \leq 0.05$.

In principle, all known phosphors which can be excited by long-wavelength radiation are suitable for the phosphor layer(s) generating the visible radiation. In detail, in particular the phosphors listed below are suitable.

Examples of suitable green phosphor components, which can be used either mixed with the UVA component in the first phosphor layer or in the second phosphor layer or a further phosphor layer, include:

K) $LnBo_3$:Ce, Tb,
  where Ln=La, Y, Gd or mixtures thereof;

L) $Ln_2SiO_5$:Ce,Tb,
  where Ln=La, Y, Gd or mixtures thereof;

M) $SrSi_2O_2N_2$:Eu.

Examples of suitable blue or blue-green phosphor components for the second phosphor layer or a further phosphor layer include:

N) $Sr_5(PO_4)_3Cl$:Eu or $Sr_5(PO_4)_3Cl$:Eu,Mn;

O) $BaMgAl_{10}O_{16}$:Eu or $BaMgAl_{10}O_{16}$:Eu,Mn;

P) $SrMgAl_{10}O_{16}$:Eu or $SrMgAl_{10}O_{16}$:Eu,Mn;

Q) $Sr_4Al_{14}O_{25}$:Eu or $Sr_4Al_{14}O_{25}$:Eu,Mn.

Examples of suitable red phosphor components, preferably for the second phosphor layer or a further phosphor layer, include:

R) $Ln_2O_2S_2$:Eu,
  where Ln=La, Y, Gd or mixtures thereof;

S) $R_2Si_5N_8$:Eu,
  where R=Ba, Ca, Sr.

Examples of suitable yellow phosphor components, in particular in combination with one of the blue phosphor components listed under N-Q, include:

T) YAG:Ce, including variants which are known per se to the person skilled in the art;

U) $CaSi_2O_2N_2$:$Eu^{2+}$;

V) $Sr_2Si_5N_8$:$Ce^{3+}$.

Slight variations in the stoichiometric compositions of the phosphor components listed above are customary and are therefore also encompassed by the explanations given above.

BRIEF DESCRIPTIONS OF THE DRAWINGS

The invention is to be explained in more detail below with reference to an exemplary embodiment. In the drawing.

BEST MODE FOR CARRYING OUT THE INVENTION

Figure 1A:
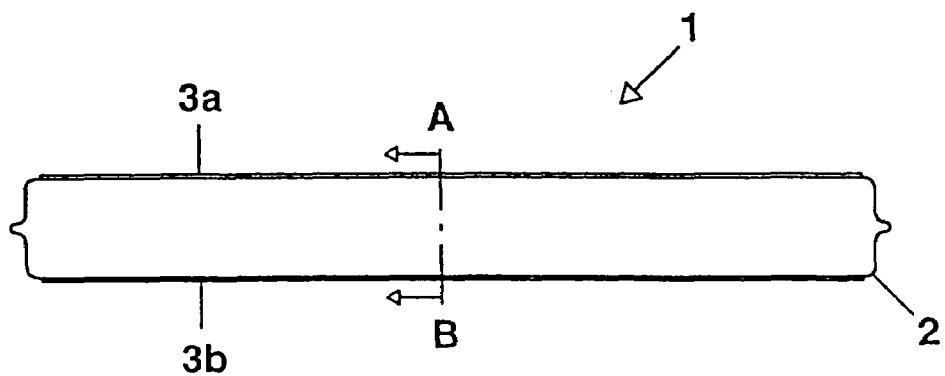
FIG. 1a shows a side view of a dielectric barrier discharge lamp.
Figure 1B:
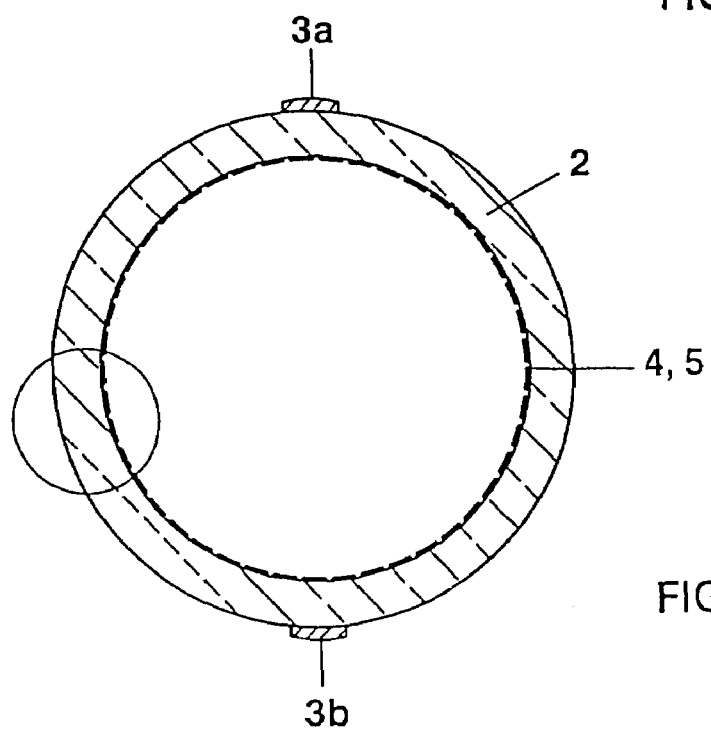
FIG. 1b shows a cross section through the lamp from FIG. 1a on line AB.
Figure 1C:
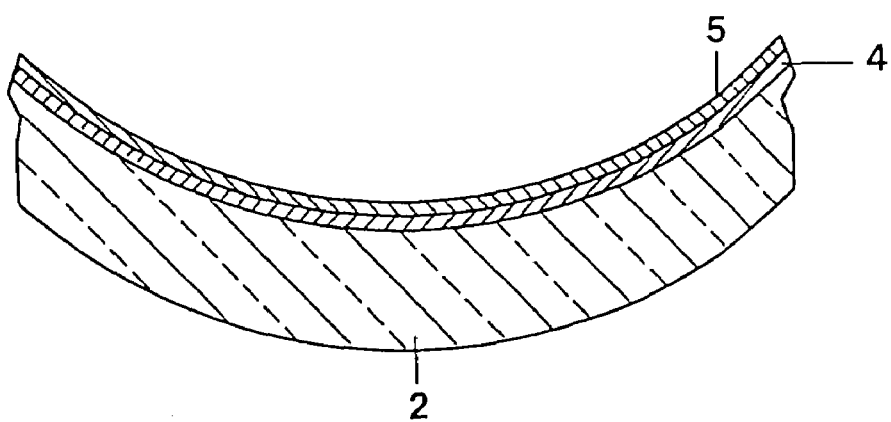
FIG. 1c shows an enlarged excerpt of the cross section from FIG. 1b.

In the following explanation of an exemplary embodiment of the invention, reference is made to FIGS. 1a-1c.

The discharge lamp 1 has a tubular discharge vessel 2 which is closed on both sides and has an external diameter of approx. 10 mm. The discharge vessel 2 consists of soda-lime glass and is filled with xenon with a pressure of approx. 15 kPa as discharge medium. Two metallic electrodes 3a, 3b, which are formed as linear conductor tracks, are applied to the outer side of the wall of the discharge vessel 2, diametrically opposite one another and parallel to the longitudinal axis of the discharge vessel. An "inner"

phosphor layer 4 and an "outer" phosphor layer 5 are applied to the inner side of the wall of the discharge vessel 2. The "outer" phosphor layer 5, which is the first phosphor layer with respect to the discharge medium, consists of the UVA component $Ce_{0.99}Ba_{0.01}MgAl_{11}O_{18.99}$ with a layer weight of 1.8 mg/cm². The "inner" phosphor layer 4, which is the second phosphor layer with respect to the discharge medium consists of a mixture of the red phosphor component (R) $Y_2O_2S_2$: Eu, the green phosphor component (G) $YBO_3$:Ce, Tb and the blue phosphor component (B) $BaMgAl_{10}O_{16}$:Eu, in a mixing ratio in percent by weight of R:G:B=20:60:20. The layer weight of the second phosphor layer 4 is likewise 1.8 mg/cm². After an operating time of the lamp 1 of 100 hours, there was still no evidence of any shift in color locus, whereas a comparable lamp with a VUV three-band phosphor mixture comprising the phosphor components $YBO_3$: Eu, $LaPO_4$:Ce and $BaMgAl_{10}O_{16}$:Eu in a mixing ratio in percent by weight of 20:60:20 already had a color locus drift of $\Delta x/\Delta y=0.004/0.004$ (in accordance with CIE standard chromaticity diagram).

Although the above text has explained the invention on the basis of the example of a tubular discharge lamp, it is not restricted to this particular type of lamp. Rather, the invention reveals its advantageous effects irrespective of the shape of discharge vessel. Therefore, by way of example, flat lamp shapes, as disclosed for example in document U.S. Pat. No. 5,994,849 are equally suitable. Moreover, it is not in principle important whether the electrodes are arranged on the outer side of the discharge vessel wall or alternatively on the inner side and are covered with a dielectric layer. It is also possible for the electrodes to have no barrier coating whatsoever. The only crucial factor in connection with the problems outlined in the introduction is that the discharge medium emits VUV radiation when the lamp is operating. However, dielectric barrier discharge lamps have a certain preferred position in this respect, since, as has already been mentioned in the introduction, they can be used to generate VUV radiation particularly efficiently in a special pulsed mode.

What is claimed is:

1. A dielectric barrier discharge lamp, comprising:
a discharge vessel having a wall with an inner side,
a xenon gas discharge medium which is located in the interior of the discharge vessel and, when the lamp is operating, emits electromagnetic radiation in the VUV region with a maximum at approximately 172 nm,
a first phosphor layer applied to the inner side of the wall of the discharge vessel and comprising a UVA component, the UVA component being excitable by the VUV radiation to emit electromagnetic radiation in the UVA region, and
a second phosphor layer, which can be excited by the UVA radiation to emit electromagnetic radiation in the visible region,
the order of the phosphor layers being such that, as seen from the discharge medium, the first phosphor layer comes first, followed by the second phosphor layer.

2. The discharge lamp as claimed in claim 1, in which the second phosphor layer is applied to the inner side of the wall of the discharge vessel beneath the first phosphor layer.

3. The discharge lamp as claimed in claim 2, wherein there is no shift in the color locus of lamp after 100 hours of operation.

4. The discharge lamp as claimed in claim 1, in which the second phosphor layer is applied to the outer side of the wall of the discharge vessel.

5. The discharge lamp as claimed in claim 1, comprising the UVA component
$Ce_{a-c}Ln_bR_cMg_dAl_{11}O_{16.5+1.5(a+b)-0.5c+d}$,
where
Ln=La, Y, Gd,
R=Ba, Ca, Sr
and
$0.10 \leq a \leq 1.00$;
$0 \leq b \leq 09$;
$0 \leq c \leq 0.5a$;
$0.45 \leq d \leq 2.00$;
$a+b \leq 1$.

6. The discharge lamp as claimed in claim 1, comprising the UVA component
$Ln_{1-x}Ce_xPO_4$,
where
Ln=La, Y, Gd or mixtures thereof
and
$0.01 \leq x \leq 0.30$
preferably
$0.02 \leq x \leq 0.10$.

7. The discharge lamp as claimed in claim 1, comprising the UVA component
$Ln_{1-x}Ce_xBO_3$,
where
Ln=La, Y, Gd or mixtures thereof,
and $0.01 \leq x \leq 0.20$
preferably
$0.02 \leq x \leq 0.10$.

8. The discharge lamp as claimed in claim 1, in which the second phosphor layer comprises a blue or blue-green phosphor component.

9. The discharge lamp as claimed in claim 1, comprising the blue phosphor component $Sr_5(PO_4)_3Cl$:Eu
or the
blue-green phosphor component $Sr_5(PO_4)_3Cl$:Eu,Mn.

10. The discharge lamp as claimed in claim 1, comprising the blue phosphor component $BaMgAl_{10}O_{16}$:Eu
or the
blue-green phosphor component $BaMgAl_{10}O_{16}$:Eu,Mn.

11. The discharge lamp as claimed in claim 1, comprising the blue phosphor component $SrMgAl_{10}O_{16}$:Eu
or the
blue-green phosphor component $SrMgAl_{10}O_{16}$:Eu,Mn.

12. The discharge lamp as claimed in claim 1, comprising the blue phosphor component $Sr_4Al_{14}O_{25}$:Eu
or the
blue-green phosphor component $Sr_4Al_{14}O_{25}$:Eu,Mn.

13. The discharge lamp as claimed in claim 1, having a green phosphor component in either the second or first phosphor layer.

14. The discharge lamp as claimed in claim 11 comprising the green phosphor component $LnBO_3$:Ce,Tb,
where
Ln=La, Y, Gd or mixtures thereof.

15. The discharge lamp as claimed in claim 11 comprising the green phosphor component $Ln_2SiO_5$:Ce,Tb,
where
Ln=La, Y, Gd or mixtures thereof.

16. The discharge lamp as claimed in claim 11, comprising the
green phosphor component $SrSi_2O_2N_2$:Eu.

17. The discharge lamp as claimed in claim 1, comprising a red phosphor component in either the first or second phosphor layer.

18. The discharge lamp as claimed in claim 17, comprising the red phosphor component $Ln_2O_2S_2$:Eu,
where
$Ln$=La, Y, Gd or mixtures thereof.

19. The discharge lamp as claimed in claim 17, comprising the red phosphor component $R_2Si_5N_8$:Eu,
where R=Ba, Ca, Sr.

20. The discharge lamp as claimed in claim 1, comprising a yellow phosphor component.

21. The discharge lamp as claimed in claim 20, comprising the yellow phosphor component YAG:Ce.

22. The discharge lamp as claimed in claim 20, comprising the yellow phosphor component $CaSi_2O_2N_2$:$Eu^{2+}$.

23. The discharge lamp as claimed in claim 20, comprising the yellow phosphor component $Sr_2Si_5N_8$:$Ce^{3+}$.

* * * * *